United States Patent
Di Monte, Sr.

(10) Patent No.: US 10,030,372 B2
(45) Date of Patent: *Jul. 24, 2018

(54) AIR ADMITTANCE AND CHECK VALVE

(71) Applicant: AA Anti-Air-Lock Corp, Iselin, NJ (US)

(72) Inventor: Michael Anthony Di Monte, Sr., Cream Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/275,419

(22) Filed: Sep. 25, 2016

(65) Prior Publication Data

US 2017/0009437 A1 Jan. 12, 2017

Related U.S. Application Data

(63) Continuation-in-part of application No. 15/246,464, filed on Aug. 24, 2016, which is a (Continued)

(51) Int. Cl.
*F16K 15/04* (2006.01)
*B01D 46/00* (2006.01)
(Continued)

(52) U.S. Cl.
CPC .......... *E03C 1/1225* (2013.01); *F16K 15/042* (2013.01); *F16K 15/048* (2013.01); *F16K 27/0209* (2013.01)

(58) Field of Classification Search
CPC ... E03C 1/1225; F16K 15/048; F16K 27/0209
(Continued)

(56) References Cited

U.S. PATENT DOCUMENTS 2,394,911 A   9/1943   Griswold et al.
3,513,875 A * 5/1970   Nelson ............. F16K 7/00
                                          137/223
(Continued)

FOREIGN PATENT DOCUMENTS

RU   2059138 C1   4/1996

OTHER PUBLICATIONS

HAYWARD® PVC Ball Check Valves With EPDM O-Rings www.hayward-valves.com/check-valves/TC-CHECK-VALVES-PVC-EPDM.html Aug. 21, 2015.
(Continued)

*Primary Examiner* — Craig Schneider
*Assistant Examiner* — P. Macade Nichols

(57) ABSTRACT

An apparatus to allow or stop a flow into a piping system or an enclosed environment comprises (a) a housing having an upper flow passage and a lower flow passage; (b) a valve seat, wherein the valve seat is between the upper flow passage and the lower flow passage, wherein at least one opening is formed on the valve seat; (c) at least one rotary valve inside the housing, wherein each of the at least one rotary valve further comprises a main body and two guides mounted to the main body opposite to each other, and wherein the at least one rotary valve can move inside the upper flow passage and above the valve seat; and (d) at least two guide rails inside the upper flow passage for guiding each of the at least one rotary valve between an open position and a closed position.

23 Claims, 14 Drawing Sheets

Related U.S. Application Data continuation-in-part of application No. 15/132,131, filed on Apr. 18, 2016, now Pat. No. 9,797,120.

(51) Int. Cl.
*E03C 1/122* (2006.01)
*F16K 27/02* (2006.01)

(58) Field of Classification Search
USPC .............................. 137/539, 533.11–533.21
See application file for complete search history.

(56) References Cited

U.S. PATENT DOCUMENTS

| | | | | |
|---|---|---|---|---|
| 4,139,469 A | * | 2/1979 | Rainin | B01D 15/166 137/512 |
| 5,474,541 A | * | 12/1995 | Ritsky | B65D 47/06 137/533.11 |
| 6,234,198 B1 | | 5/2001 | Chalich | |
| 7,140,388 B2 | | 11/2006 | Chalich | |
| 8,403,241 B2 | | 3/2013 | Jung | |
| 2003/0062086 A1 | | 4/2003 | Chalich | |

OTHER PUBLICATIONS

HAYWARD® Product Manual, TC Series True Union Ball Check Valves, pp. 29-30, 2015.

* cited by examiner

AIR ADMITTANCE AND CHECK VALVE

CROSS-REFERENCE RELATED TO RELATED APPLICATIONS

This application is a continuation-in-part of commonly-owned, same inventor, presently U.S. Nonprovisional patent application Ser. No. 15/246,464, filed Aug. 24, 2016, which is incorporated herein by reference in its entirety. The Nonprovisional patent application Ser. No. 15/246,464 application is also a continuation-in-part of commonly-owned, same inventor, presently U.S. Nonprovisional patent application Ser. No. 15/132,131, filed Apr. 18, 2016, which is incorporated herein by reference in its entirety. U.S. Nonprovisional patent application Ser. No. 15/132,131 also claims the priority and benefit of US provisional patent application No. U.S. Provisional Application No. 62/151,463, filed Apr. 23, 2015.

STATEMENT REGARDING FEDERALLY SPONSORED RESEARCH OR DEVELOPMENT

Not Applicable

BACKGROUND

A variety of air admittance valves have been made over the years for allowing air to enter a piping system or an enclosed environment under a negative or vacuum pressure, which is created when water is flowing down the drain for instance thus to preventing siphoning of traps or when a sump pump keeps pumping water and air out of an enclosed sump pit. Attaching an air admittance valve allows ambient air to enter the enclosed environment to eliminate negative pressure or vacuum in the enclosed system. Many of these products are specifically or only designed for systems such as piping systems and sewer systems where a local vent or air intake is not possible or due to the difficulty of running pipes through an already built home. Typically, these air admittance valves only provide specific operating conditions such as the vacuum pressure in the amount of air required. The air admittance valves available in the market today do not provide for an instantaneous and higher volume of air demand. And this causes a problem when existing air admittance components are installed on systems requiring the higher airflow demand. This problem causes strain on the air admittance component and cause it to fail prematurely in addition it causes it to operate against its own design because it was designed to work on a natural gravity air flow vacuum or negative pressure constraint. Also it is a problem that the air admittance valves not working at all or failing immediately when a high airflow demand is required. Furthermore, another problem is that air admittance components available do not filter the air and therefore can allow for corrosive environment to enter the system and damaging the Air admittance components.

There is also an undesired negative situation that the piping system will generate a negative pressure in the piping system when the flow is drained from the piping system. When negative pressure occurs, the water seals in the U-band or trap will be syphoned out and losses the function to prevent sewer gas to enter the house. Therefore, various air admittance valves have designed to allow air enter a piping system to prevent the negative pressure environment. However, regular air admittance valve is also easy to fail.

For these reasons are users are disappointed when there is no product available on the market that they can use for a higher volume demand in a negative pressure scenario such as an enclosed pit with a pump requiring air to enter the system at the same rate of which it is pumping the water out. For instance, a pump that can pump 20 gallons per minute and would require a large demand of airflow to enter the system so that a vacuum does not occur putting stress on the pump and causing the water discharge to not operate and discharge the water properly. In the case of a sump pump, the pump becomes air locked and runs continuous which causes the pump to overheat, burnout and/or fail causing the area to flood and cause water damage to the building.

In many cases it is also required that after air enters the system that there is a proper seal in place to provide a radon gas, water and airtight seal after the air has been allowed to enter the system and when the pump disengages. It is also required that if failure is to occur on such an air admittance component that it must fail in a closed/sealed position providing continued protection so that no air, water or radon gas can escape into the air within the building or within a certain high of the structures roof line on the exterior.

Although some check valves have the design of a ball inside the valve to stop or open the flow to pass through the valve. However, those ball valve tends to have accumulated scum or fouls on the ball that cause the ball not able to seal the flow properly. Also, such ball valve, after having scum or fouls on the ball, will not have a proper rotation to reduce the opportunity of wearing of the ball in same location. Therefore, there is a long-felt need to resolve such issues.

BRIEF SUMMARY OF THE INVENTION

This Brief Summary is included so as to introduce, in an abbreviated form, various topics to be elaborated upon below in the Detailed Description. This Brief Summary is not intended to identify key or essential aspects of the claimed invention. This brief Summary is similarly not intended for use as an aid in determining the scope of the claims. The subject matters of this application overcomes the aforementioned problems and may be used as an apparatus to allow or stop a flow into a piping system or an enclosed environment comprises (a) a housing having an upper flow passage and a lower flow passage; (b) a valve seat, wherein the valve seat is between the upper flow passage and the lower flow passage, wherein at least one opening is formed on the valve seat, wherein the at least one opening has an inner diameter; (c) at least one rotary valve inside the housing, wherein each of the at least one rotary valve further comprises a main body and two guides mounted to the main body opposite to each other, wherein the at least one rotary valve has a predetermined weight, wherein the main body of the at least one rotary valve is dimensioned to be between the inner diameter of the at least one opening of the valve seat and the inner diameter of the upper flow passage, and wherein the at least one rotary valve can move inside the upper flow passage and above the valve seat; and (d) at least two guide rails inside the upper flow passage for guiding each of the at least one rotary valve between an open position and a closed position, wherein the each of two guides of the at least one rotary valve are disposed in each of the two guide rails, and wherein the two guides move freely up and down in the two guide rails.

The apparatus is an invention that allows for the required volume of air to enter a piping system or an enclosed environment when there is a sufficient pressure difference between the ambient environment and the negative pressure in the piping system or an enclosed environment generating sufficient force to lift the rotary valve, the rotary valve will open and allow air/water flow to enter the piping system or enclosed environment. Therefore, the negative pressure will be eliminated.

When the piping system has radon gas, methane or other gas that generate positive pressure in the piping system or the enclosed environment the rotary valve will stay in the closed position and prevents radon gas, methane or other gas from leaving the piping system or the enclosed environment. The invention provides the proper seal by the rotary valve which has many advantage than the traditional flap valve. The rotation of the rotary valve will allow the contact points of the valve and the valve seat to constantly rotate and change, which will prolong the life of the valve. The rotation of the rotary valve will have less friction to move since rotational friction is less than static rotation. The rotation of the rotary valve will be less likely to be clogged and have less noise. The guide rail will allow the rotary valve to properly return back to the valve seat even when the air admittance and check valve is not installed vertically, which is a burdensome requirement for all other types of air admittance and check valves.

BRIEF DESCRIPTION OF THE DRAWINGS

It should be understood that the drawings are merely representative, are not necessarily drawn to scale, and are not intended to limit the subject matter of this application.

FIG. 10 A is a sectional view of one of the embodiments that has two rotary valves (showing two rotary valves).

FIG. 10 B is a sectional view of one of the embodiments that has two rotary valves (showing one rotary valve).

FIG. 10 C is a sectional view of one of the embodiments that has two rotary valves (rotary valves are not shown).

FIG. 10 D is a sectional view of one of the embodiments that has two rotary valves (rotary valves are not shown).

DETAILED DESCRIPTION

Figure 1:
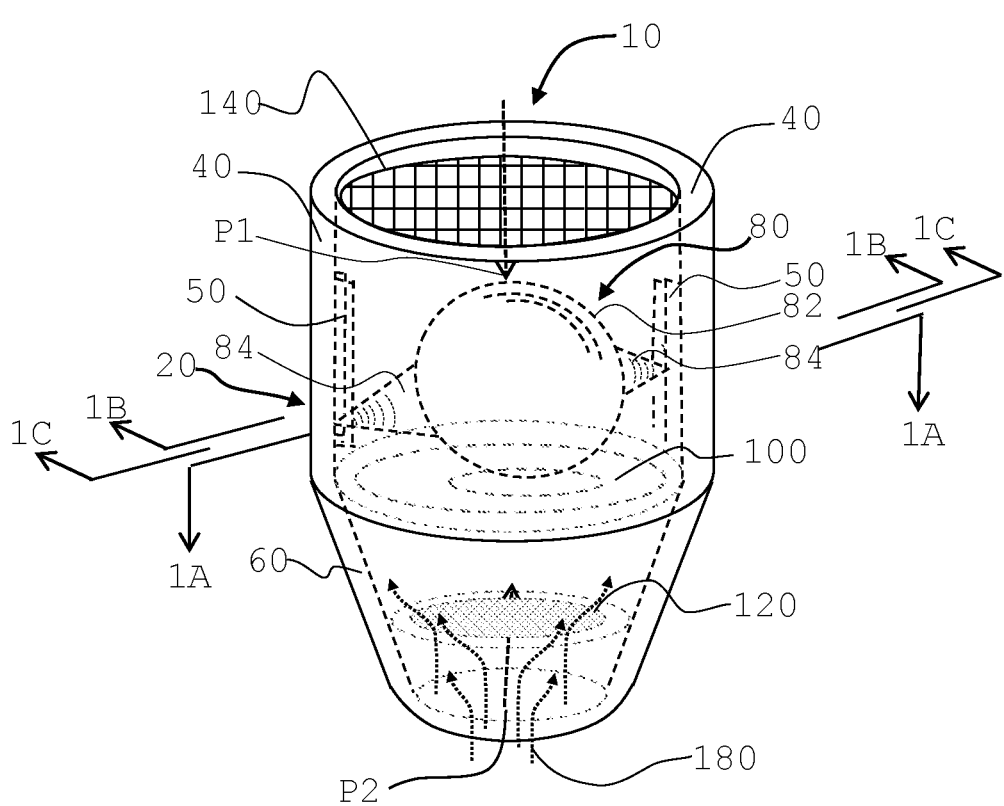
FIG. 1 is a perspective view of one of the embodiments of the invention.
Figure 1A:
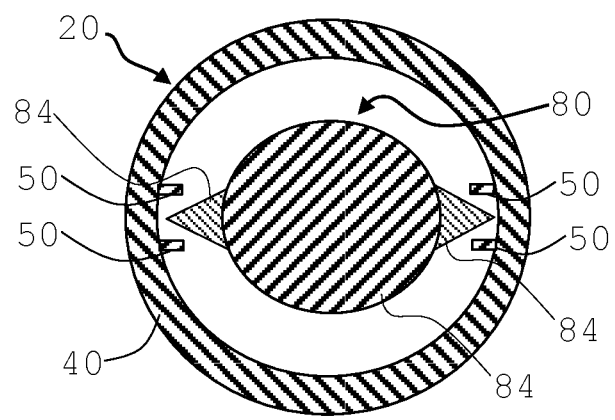
FIG. 1A is a sectional view of one of the embodiments of the invention.

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Other than in the embodiment or example, or where indicated otherwise, all numbers indicating ingredient quantities and/or reaction conditions are to be understood as being modified in every instance by the word "about," which means the ingredient quantities or reaction conditions are within 10 percent to 15 percent of the indicated value.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and the may also include the plural referents unless the context clearly dictates otherwise.

It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

Referring to FIG. 1, FIG. 1A, FIG. 1B, and FIG. 1C, one of the preferred embodiment of an apparatus 10 to allow or stop a flow 180 into an enclosed environment 200 (FIG. 5) or a piping system 300 (FIG. 7) comprises a housing 20 having an upper flow passage 40 and a lower flow passage 60; a valve seat 100, wherein the valve seat 100 is between the upper flow passage 40 and the lower flow passage 60, wherein at least one opening 106 is formed on the valve seat 100, wherein the at least one opening 106 has an inner diameter d1; at least one rotary valve 80 inside the housing 20, wherein the at least one rotary valve 80 further comprises a main body 82 and two guides 84 mounted to the main body 82 opposite to each other, wherein the at least one rotary valve 80 has a predetermined weight, wherein the main body 82 of the at least one rotary valve 80 is dimensioned to be between the inner diameter d1 of the at least one opening 106 of the valve seat 100 and the inner diameter d2 of the upper flow passage 40, and wherein the at least one rotary valve 80 can move inside the upper flow passage 40 and above the valve seat 100; and two guide rails 50 inside the upper flow passage 40 for guiding the rotary valve 80 between the open position 102 and the closed position 104, wherein the each of two guides 84 of the at least one rotary valve 80 are disposed in each of the two guide rails 50, and wherein the two guides 84 move freely up and down in the two guide rails 50. The guide rail 50 can be mounted on the valve seat 100 or molded as one with the valve seat 100. The guide rail 50 can have an angle with the valve seat 100 between about 45 degrees to 90 degrees so that the rotary valve 80 can not only move vertically and move angularly relative to the valve seat 100.

Also referring to FIG. 1, FIG. 1A, FIG. 1B, and FIG. 1C, in one preferred embodiment, the valve seat 100 is made of flexible material having a Shore Hardness between 60A and about 90A, such as but not limited to rubber, PTFE (Fluoropolymer), EPDM (Ethylene Propylene Diene Monomer), silicon, and combination thereof. In another preferred embodiment, the valve seat 100 is made of hard material, such as but not limited to PVC (Polyvinyl chloride), metal, or HDPE (High Density Polyethylene), and the circumference of the opening 106 is flushed with flexible material having a Shore Hardness between 60A and about 90A, such as but not limited to rubber, PTFE (Fluoropolymer), EPDM (Ethylene Propylene Diene Monomer), silicon, and combination thereof. An upper flow passage pressure P1 exists in the upper flow passage 40, wherein a lower flow passage 60 pressure P2 exists in the lower flow passage 60, wherein the main body 82 of the at least one rotary valve 80 is undisposed from the at least one opening 106 formed on the valve seat 100 when the at least one rotary valve 80 is in the open position 102, wherein the flow 180 can pass through the at least one opening 106 of the valve seat 100 when rotary valve 80 is in the open position 102, wherein the at least one rotary valve 80 is in the closed position 104 when the lower flow passage pressure 92 is less than or equal to the predetermined weight of the at least one rotary valve 80 and the upper flow passage pressure P1, wherein the main body 82 of the at least one rotary valve 80 is disposed on the at least one opening 106 formed on the valve seat 100 when the at least one rotary valve 80 is in closed position 104, and wherein the flow 180 cannot pass through the opening 106 of the valve seat 100 when the at least one rotary valve 80 is in the closed position 104.

Also referring to FIG. 1, FIG. 1A, FIG. 1B, and FIG. 1C, in one embodiment, the lower flow passage filter 120 in the lower flow passage 60 and the upper flow passage filter 140 in the upper flow passage 40 prevents particles and pollutants in the flow 180 from entering the housing 20 and prevents foreign objects, such as particles and bugs, from passing through the apparatus 10, which will be detrimental to the seal 160 between the at least one rotary valve 80 and the valve seat 100. The apparatus 10 can be connected with other pipes or conduits by any types of pipe connection, such as but not limited to fastener, treaded pipe, solvent welding, soldering, brazing, welding compression fittings, or crimped. The material of the housing 20 can be such as but not limited to plastic, copper, brass, cast iron, steel, and other commonly used in the field of art of piping.

Also referring to FIG. 1, FIG. 1A, FIG. 1B, and FIG. 1C, in one embodiment of the invention, the lower flow passage filter 120 in the lower flow passage 60 and the upper flow passage filter 140 in the upper flow passage 40 is made of stainless steel or durable plastics and has filter particles equal or larger than 300 micron. However, the material of the lower flow passage filter 120 and the upper flow passage filter 140 can be other types of material that can sustain high humidity, erosive environment, such as but not limited to rubber, plastic, Teflon, and galvanized steel. the at least one rotary valve 80 can be lifted by a lifting force to detach the at least one rotary valve 80 from the valve seat 100 when the lifting is created by a pressure difference when the upper flow passage pressure P1 above the valve seat 100 is less than lower flow passage pressure P2 in the lower flow passage 60. In one preferred embodiment of the invention, a lower flow passage pressure P2 in the lower flow passage 60 is about 8.7 pounds per square inch (60 Kilopascal) greater than the upper flow passage pressure P1 above the valve seat 100, wherein the flow 180 will flow through the housing 20 and the upper flow passage 40 when the at least one rotary valve 80 is lifted. The weight of the rotary valve 80 can be depended on the pressure difference that the apparatus 10 is designed to control under that situation to stop or allow the air or water passage. In one preferred embodiment of the invention, the rotary valve 80 may have a predetermined weight from about 0.01 ounce to about one pound and one ounce, depending on the application of the invention in different enclosed environment or piping systems that have difference pressures inside the enclosed environment or piping system.

Figure 2:
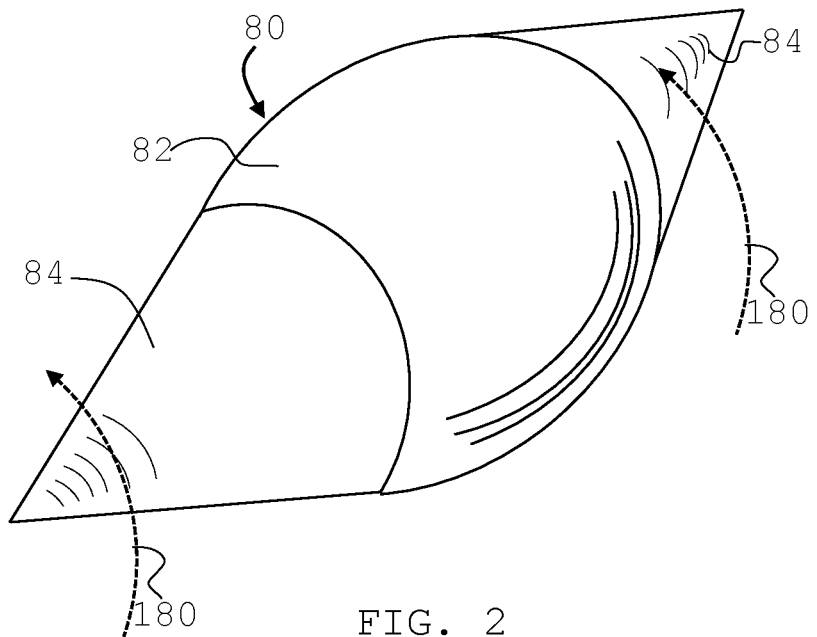
FIG. 2 is a schematic view of one of the embodiments of the rotary valve of the invention.

Referring to FIG. 2, in one embodiment of the apparatus 10, the rotary valve 80 has a main body 82 in an oval shape with two guides 84 mounted to the main body 82 opposite to each other (guides 84). The rotary valve 80 can be rotated by flow 180.

Figure 3:
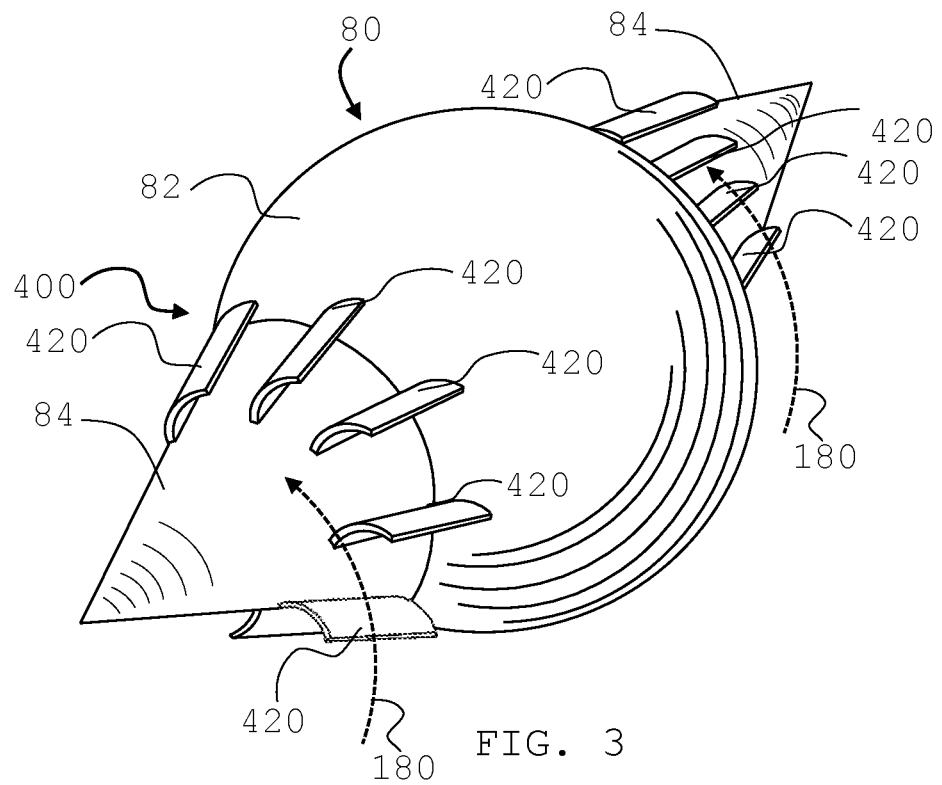
FIG. 3 is a schematic view of one of the embodiments of the rotary valve with turbulator on the guides.

Referring to FIG. 3, in one embodiment of the apparatus 10 further comprises at least two turbulators 400 mounted on each of the two guides 84, wherein the at least two turbulators 400 comprises a plurality of impellers 420 radially mounted to each of the guides 84, and wherein the at least two turbulators 400 rotate the at least one rotary valve 80 when the flow 180 from the lower flow passage 60 pushes the plurality of impellers 420. The plurality of impellers 420 slated in one single direction will ensure the rotary valve 80 rotate in one direction and faster than the rotary valve 80 without the at least two turbulators 400 (FIG. 2). The uniform rotation direction of the rotary valve 80 will increase the speed of the rotary valve 80 going up to open the rotary valve 80. The increased rotation speed of the rotary valve 80 will allows the self-cleaning of the valve to remove foul or scum accumulated on the rotary valve 80 and the opening 106.

Figure 4:
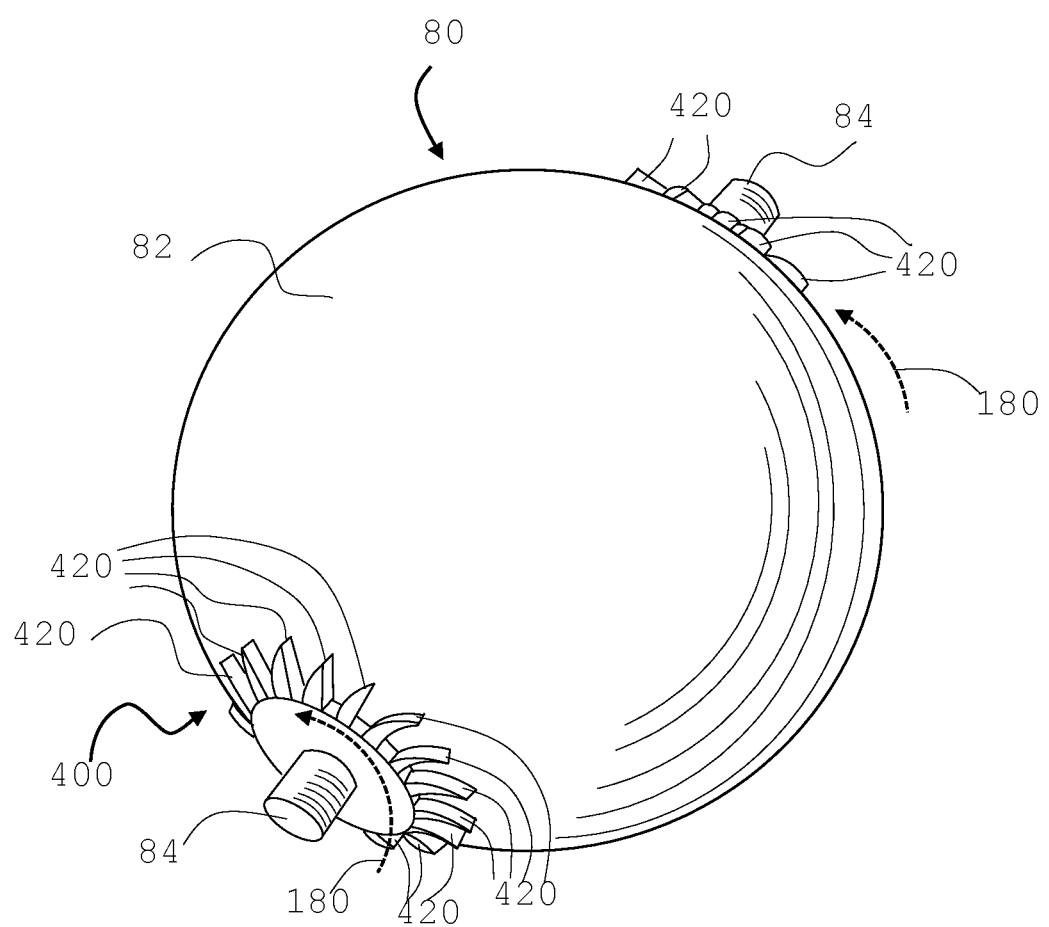
FIG. 4 is a schematic view of one of the embodiments of the rotary valve with turbulator on the main body of the rotary valve.

Referring to FIG. 4, in one embodiment of the apparatus 10 further comprises at least two turbulators 400, wherein each of the at least two turbulators 400 comprises a plurality of impellers 420 mounted to the main body 82 of the at least one rotary valve 80, wherein the plurality of impellers 420 are arranged in a circle around each of the at least two guides 84, wherein each of the at least two turbulators 400 are opposite to each other, and wherein the at least two turbulators 400 rotate the at least one rotary valve 80 when the flow 180 from the lower flow passage 60 pushes the plurality of impellers 420. The plurality of impellers 420 in one single direction will ensure the rotary valve 80 rotate in one direction and faster than the rotary valve 80 without turbulators 400 (FIG. 2). The uniform rotation direction of the rotary valve 80 will increase the speed of the rotary valve 80 going up to open the rotary valve 80.

Figure 5:
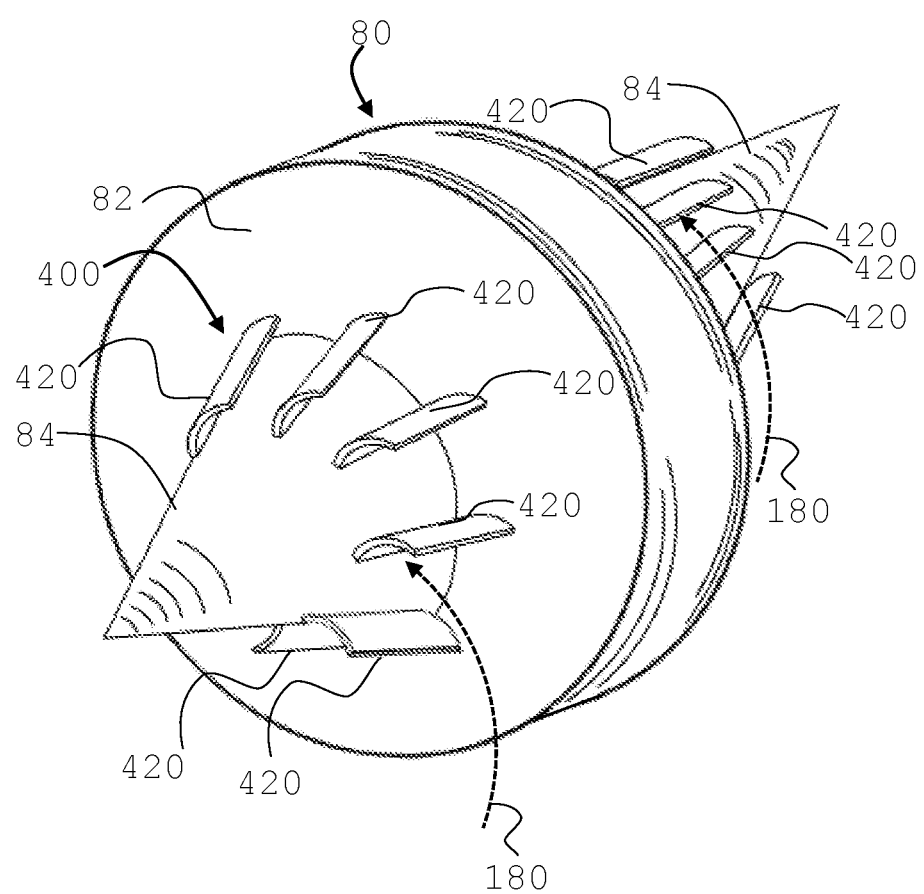
FIG. 5 is a schematic view of one of the embodiments of the rotary valve in disk shape.

Referring to FIG. 5, in one embodiment of the apparatus 10 the main body 82 has a disc shape with turbulators 400 comprising a plurality of impellers 420. The main body 82 of the at least one rotary valve 80 can be in different rotatable shapes, such as oval, disc, round, or cylinder.

Figure 6:
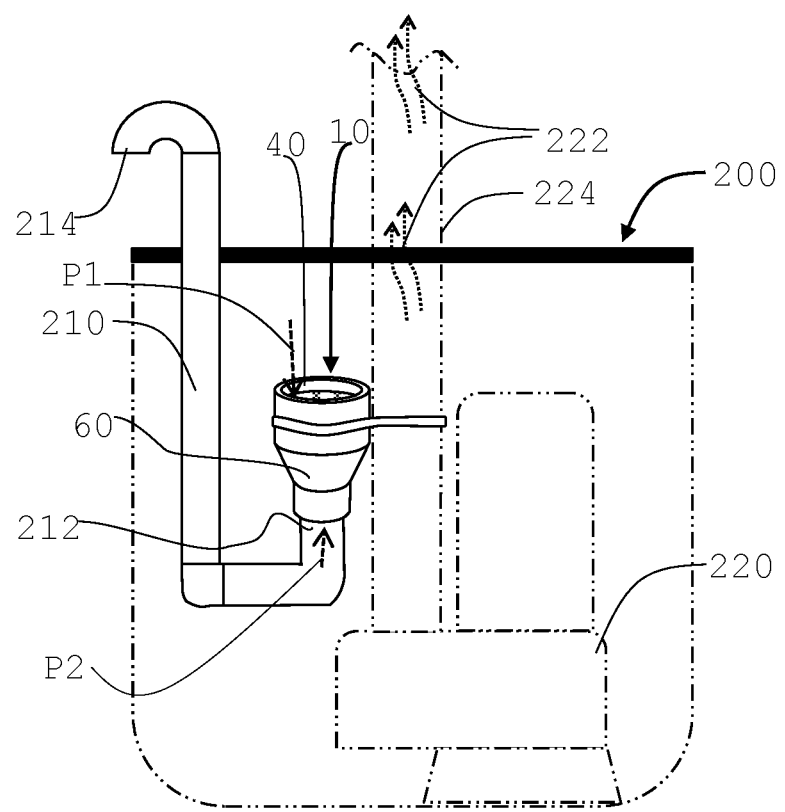
FIG. 6 is a schematic view of one of the embodiments of the invention inside an enclosed environment.

Referring to FIG. 6, in one embodiment of the apparatus 10, the apparatus 10 is inside an enclosed environment 200, wherein the enclosed environment 200 has an ambient pressure same as the upper flow passage pressure P1 in the enclosed environment 200, wherein the enclosed environment 200 further comprises at least one conduit 210, wherein each the at least one conduit 210 has a first end 212 and a second end 214, wherein each of the at least one conduit 210 has the first end 212 connected to the lower flow passage 60 of the apparatus 10 and the second end 214 extends out of the enclosed environment 200, wherein the upper flow passage 40 is opened and adopted to the ambient pressure P1 of the enclosed environment 200, wherein the enclosed environment 200 has at least one pumping device 220, which conveys water and/or air 222 in the enclosed environment 200 to outside the enclosed environment 200, and wherein the at least one pumping device 220 causes a the pressure difference to the apparatus 10 when the at least one pumping device 220 conveys water and/or air 222 through at least one pipe 224 out of the enclosed environment 200. The pumping of pumping device 220 will cause a vacuum, negative pressure situation, which causes the upper flow passage pressure P1 in the enclosed environment 200 to drop, and the lower flow passage pressure P2 in the lower flow passage 60 becomes greater than flow passage pressure P1 and the weight of the rotary valve 80; therefore, a lifting force to lift the rotary valve 80 (FIG. 3) off the valve seat 100 (FIG. 3) to allow flow 180 from lower flow passage 60 to upper flow passage 40 and the enclosed environment 200 to release the negative pressure condition. In one preferred embodiment, the apparatus 10 is designed to provide at least flow 180 of 12 Cubic Inch/Second per each millimeter of pipe 224 of the at least one pumping device 220.

Figure 7:
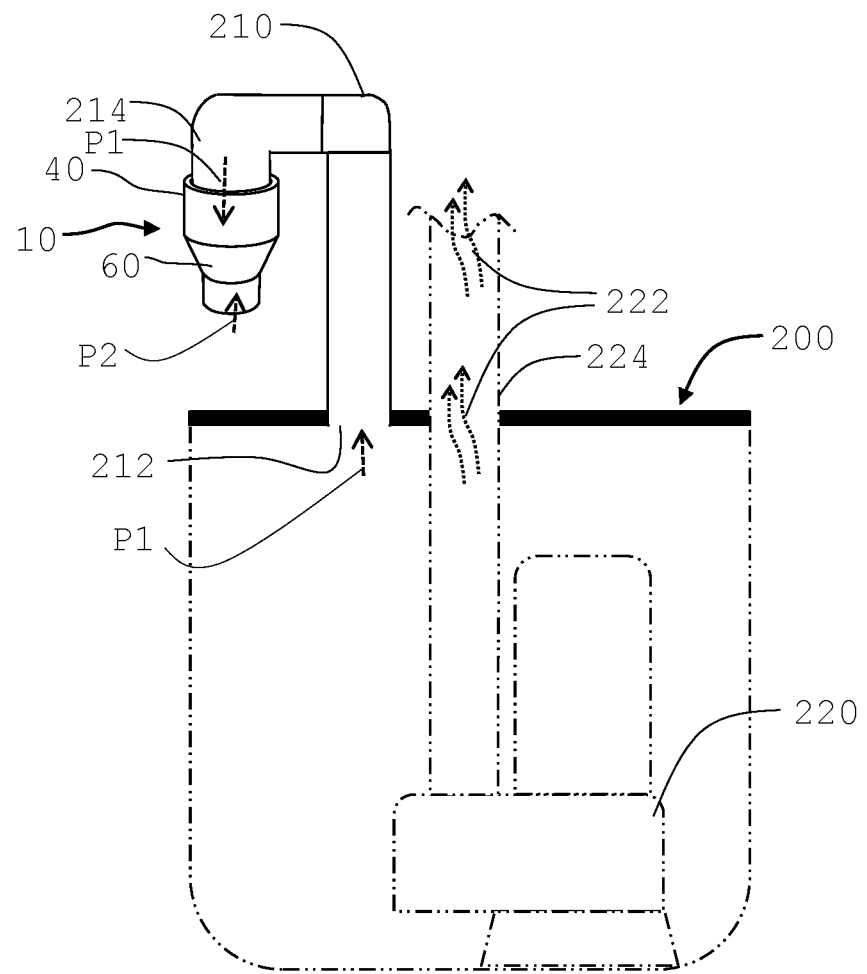
FIG. 7 is a schematic view of one of the embodiments of the invention outside an enclosed environment.

Referring to FIG. 7, in one embodiment of the apparatus 10, the apparatus 10 is outside an enclosed environment 200, wherein the enclosed environment 200 has an ambient pressure in the enclosed environment 200 same as the upper flow passage pressure p1, wherein the enclosed environment 200 further comprises at least one conduit 210, wherein each the at least one conduit 210 has a first end 212 and a second end 214, wherein each of the at least one conduit 210 has the first end 212 connected to the upper flow passage 40 of the apparatus 10 and the second end 214 extends into the enclosed environment 200, wherein the upper flow passage 40 is opened and adopted to the ambient pressure P1 of the enclosed environment 200, wherein the enclosed environment 200 has at least one pumping device 220, which conveys water and/or air 222 in the enclosed environment 200 to outside the enclosed environment 200. The pumping of pumping device 220 will cause a vacuum, negative pressure situation, which causes the upper flow passage pressure P1 in the enclosed environment 200 to drop, and the lower flow passage pressure P2 in the lower flow passage 60 becomes greater than the upper flow passage pressure P1 and the weight of the rotary valve 80; therefore, a lifting force to lift the rotary valve 80 (FIG. 3) off the valve seat 100 (FIG. 3) to allow flow 180 from lower flow passage 60 to upper flow passage 40 and the enclosed environment 200 to release the negative pressure condition. In one preferred embodiment, the apparatus 10 is designed to provide at least flow 180 of 12 Cubic Inch/Second per each millimeter of pipe 224 of the at least one pumping device 220.

Figure 1B:
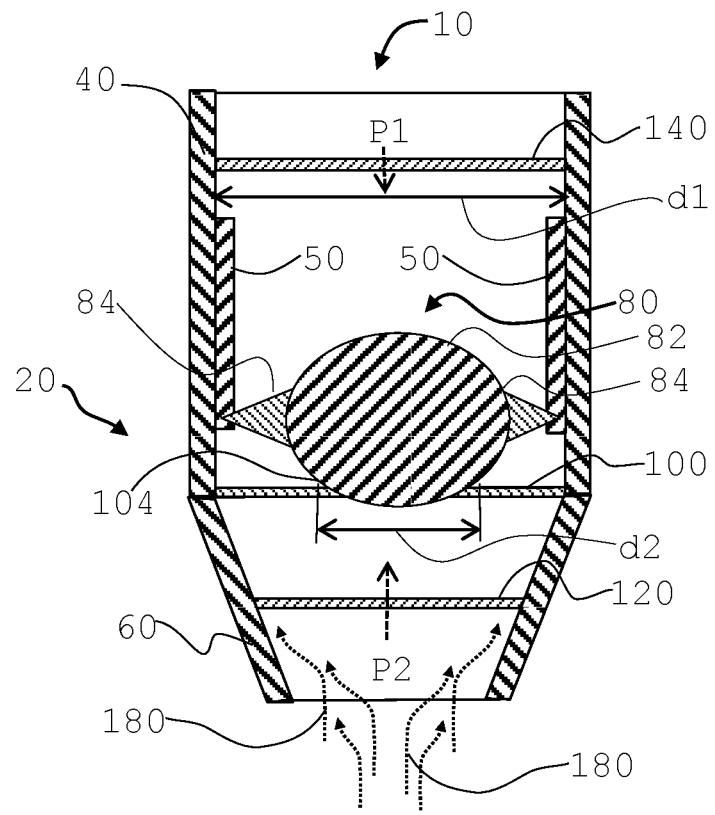
FIG. 1B is a sectional view from the side of one of the embodiments of the invention when the rotary valve is in a closed position.
Figure 1C:
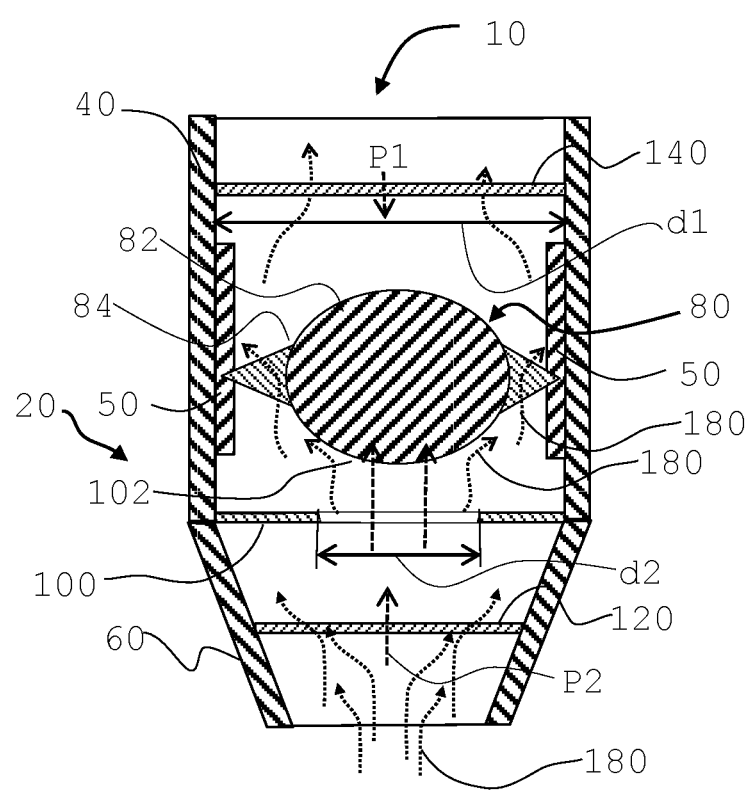
FIG. 1C is a sectional view from the side of one of the embodiments of the invention when the rotary valve is in a closed position.
Figure 8:
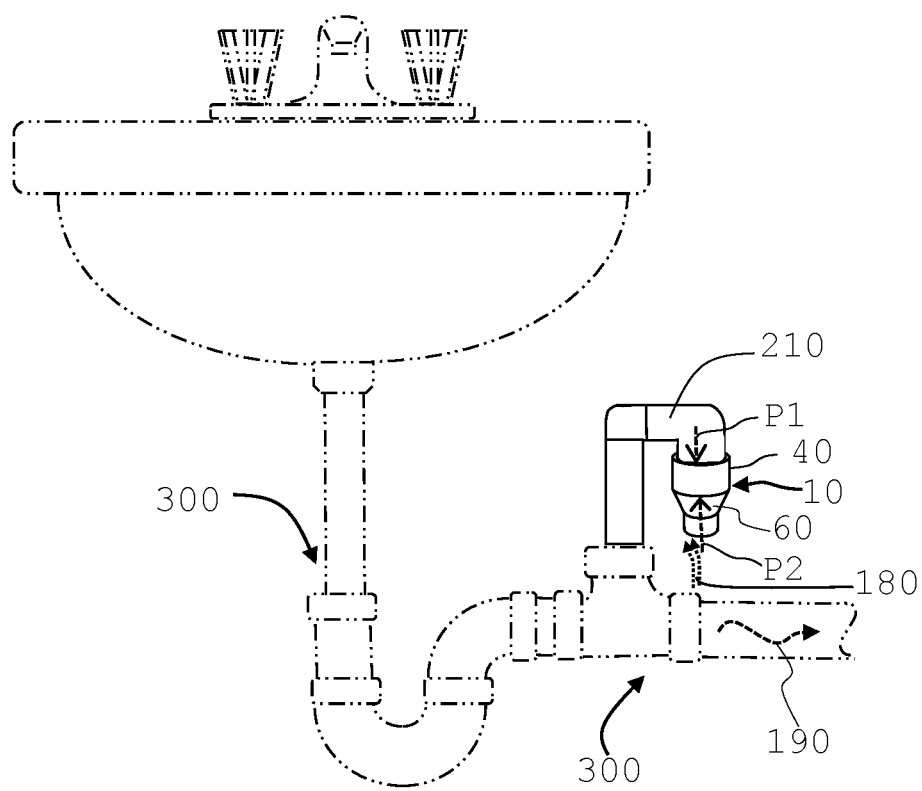
FIG. 8 is a schematic view of one of the embodiments of the invention installed in a piping system.

Referring to FIG. 8 and FIG. 1C, in one embodiment of the apparatus 10, the apparatus 10 is installed to an piping system 300, wherein piping system 300 wherein the piping system 300 further comprises at least one conduit 210, wherein each the at least one conduit 210 connected to the upper flow passage 40 of the apparatus 10, wherein the upper flow passage 40 has an upper flow passage P1 adopted to the ambient pressure of the piping system 300, wherein a draining flow 190 is drained from the piping system 300 causing a negative pressure situation, which causes the upper flow passage pressure P1 in the enclosed environment 200 to drop, and the lower flow passage pressure P2 in the lower flow passage 60 becomes greater than upper flow passage pressure P1 and the weight of the rotary valve 80 (FIG. 1C); therefore, a lifting force to lift the rotary valve 80 (FIG. 3) off the valve seat 100 (FIG. 3) to allow a flow 180, such as air, entering lower flow passage 60 to upper flow passage 40 and then to the piping system 300 to release the negative pressure condition.

Figure 9:
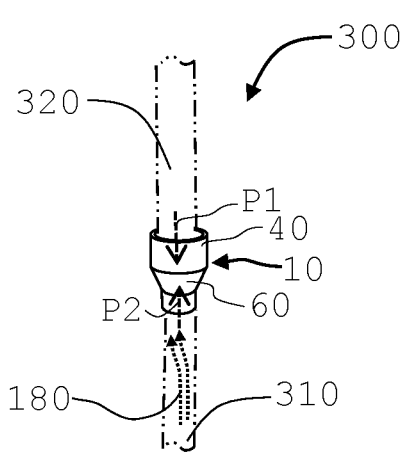
FIG. 9 is a schematic view of one of the embodiments of the invention installed in another piping system.
Figure 10:
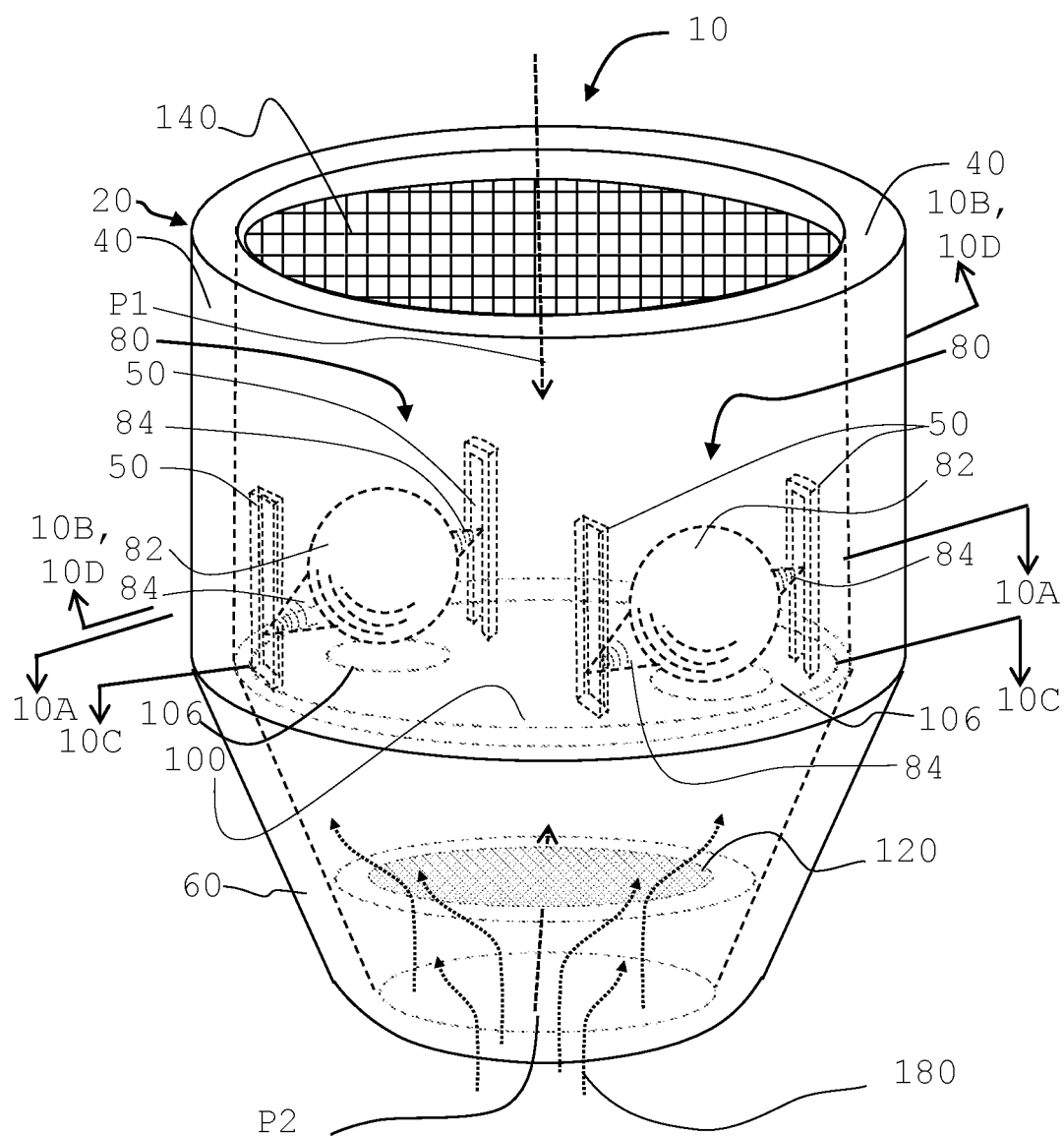
FIG. 10 is a perspective view of one of the embodiments that has two rotary valves.
Figure 10A:
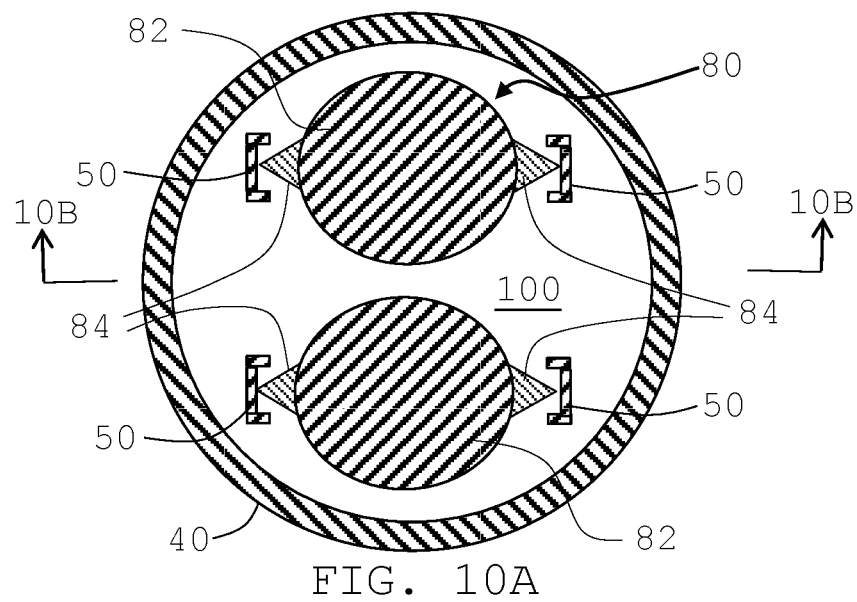
Figure 10B:
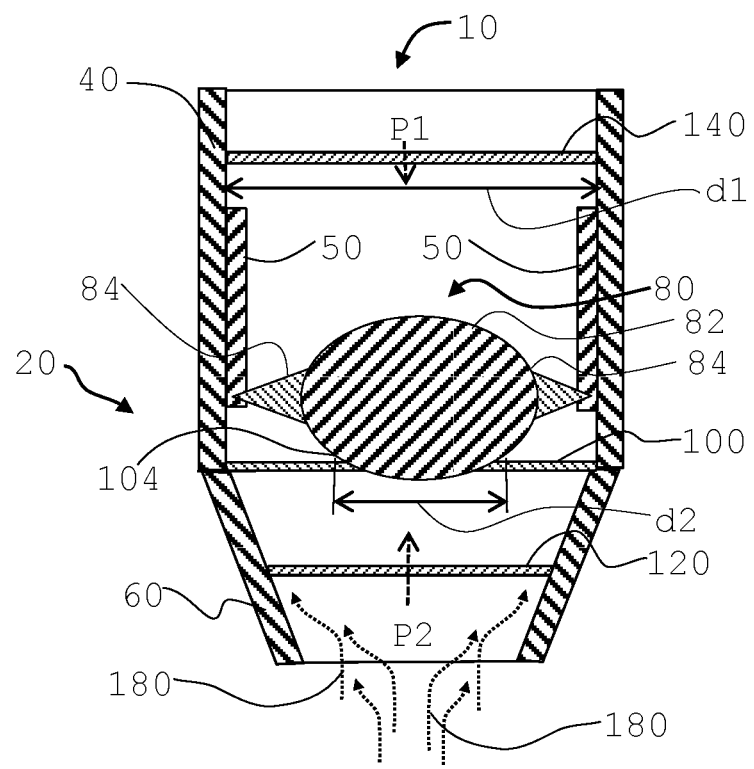
Figure 10C:
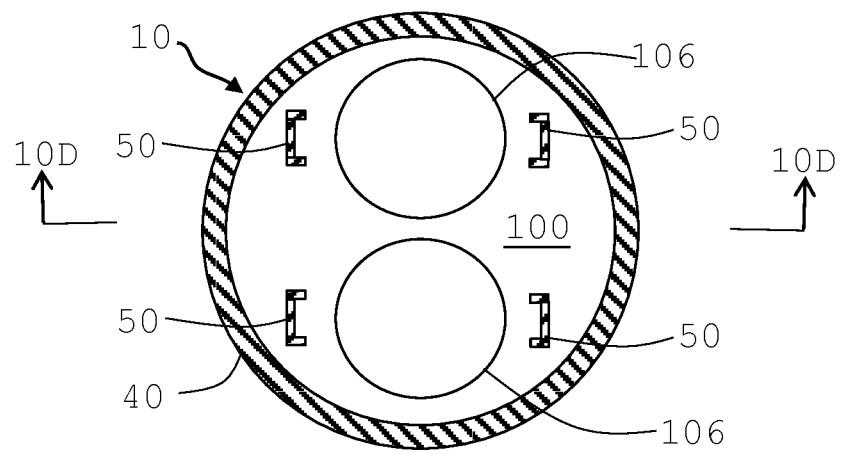
Figure 10D:
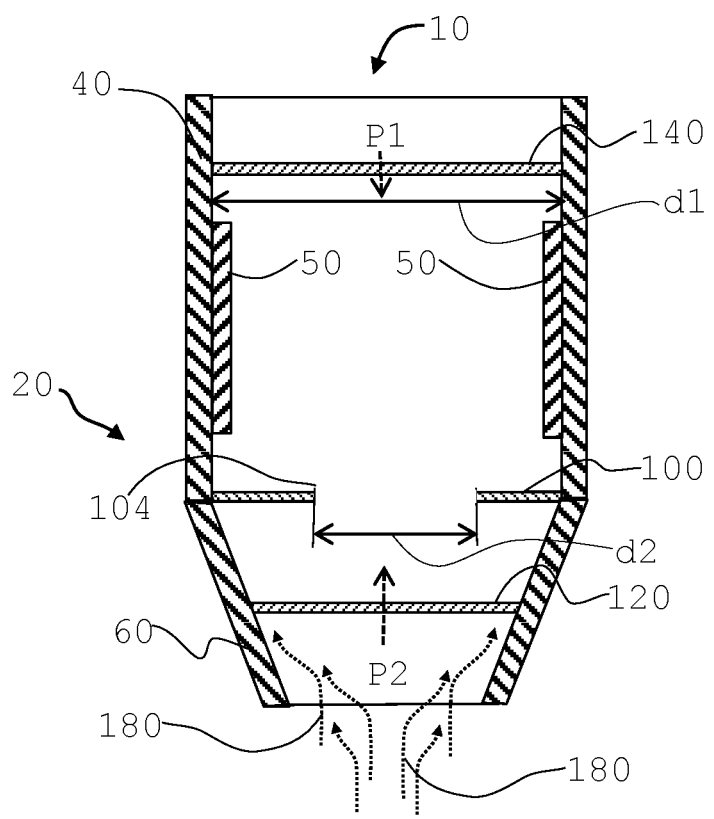

Referring to FIG. 9, FIG. 1B, and FIG. 1C, in one embodiment of the apparatus 10, the apparatus 10 is installed in a piping system 300, wherein the piping system has a flow 180 moves between a lower elevation position 310 of the piping system 300 to a upper elevation position 320 of the piping system 300, wherein the upper flow passage 40 of the apparatus 10 is communicated with the upper flow passage 40 communicated with the upper elevation position 320 of the piping system 300, wherein the lower flow passage 60 is communicated with the lower elevation position 310 of the piping system 300, wherein the at least one rotary valve 80 (FIG. 1C) is in an open position 102 (FIG. 1C), wherein the flow 180 moves from the lower elevation position 310 of the piping system 300 toward the upper elevation position 320 of the piping system 300, and wherein the at least one rotary valve 80 (FIG. 1B) is in the closed position 104 (FIG. 1B) wherein the flow 180 moves from the upper elevation position 320 of the piping system 300 toward the lower elevation position 310 of the piping system 300.

Referring to FIG. 10, FIG. 10A, FIG. 10B, FIG. 10C, and FIG. 10D, in one embodiment of the apparatus 10, the apparatus 10 has two rotary valves 80 inside the housing 20. The valve seat 100 has two openings 106 formed on the valve seat 100. There are also four guide rails 50 mounted on the valve seat 100. Also referring to FIG. 10, FIG. 10A, FIG. 10B, FIG. 10C, and FIG. 10D, in one embodiment of the invention with two rotary valves, a housing 20 having an upper flow passage 40 and a lower flow passage 60; a valve seat 100, wherein the valve seat 100 is between the upper flow passage 40 and the lower flow passage 60, wherein two openings 106 are formed on the valve seat 100, wherein each of the one opening 106 has an inner diameter d1; two rotary valves 80 inside the housing 20, wherein two rotary valves 80 further comprises a main body 82 and two guides 84 mounted to the main body 82 opposite to each other, wherein each of two rotary valves 80 have a predetermined weight, wherein the main body 82 of each rotary valve 80 is dimensioned to be between the inner diameter d1 of the at least one opening 106 of the valve seat 100 and the inner diameter d2 of the upper flow passage 40, and wherein two rotary valves 80 can move inside the upper flow passage 40 and above the valve seat 100; and four guide rails 50 inside the upper flow passage 40 for guiding the rotary valves 80 between the open position 102 and the closed position 104, wherein the each of two guides 84 of the two rotary valves 80 are disposed in each of the four guide rails 50, and wherein the four guides 84 move freely up and down in the four guide rails 50. The guide rail 50 can be mounted on the valve seat 100 or molded as one with the valve seat 100. The guide rail 50 can have an angle with the valve seat 100 between about 45 degrees to 90 degrees so that the rotary valve 80 can not only move vertically and move angularly relative to the valve seat 100.

Figure 11:
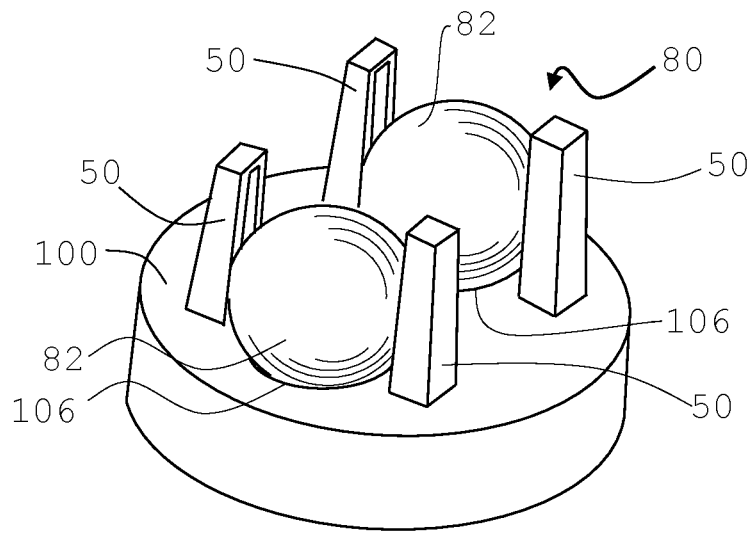
FIG. 11 is a perspective view from the top of one of the embodiment of the valve seat and rotary valves of the invention that has two rotary valves.
Figure 12:
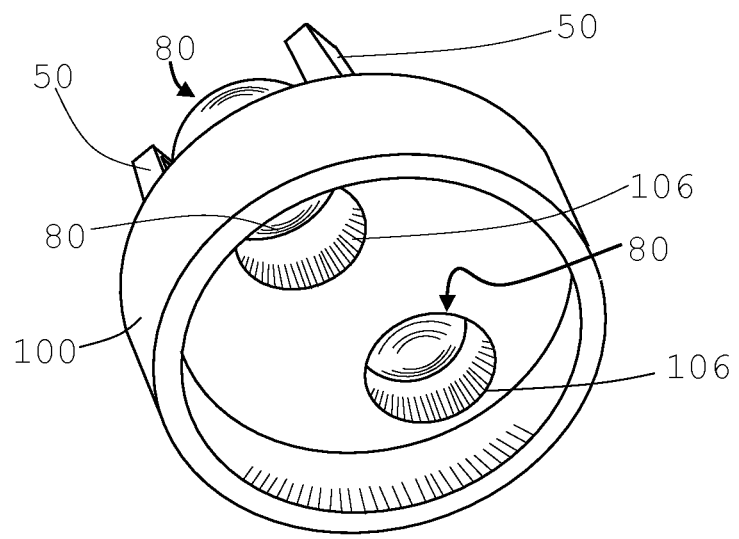
FIG. 12 is a perspective view from the bottom of one of the embodiment of the valve seat and rotary valves of the invention that has two rotary valves.

Referring to FIG. 11 and FIG. 12 in one embodiment of the apparatus 10, the apparatus 10 has two rotary valves 80, four guide rails 50 mounted on the valve seat 100, wherein two openings 106 are formed on the valve seat 100, and wherein the main body 82 of the rotary valve 80 can reside at the opening 106 on the valve seat 100.

Figure 13:
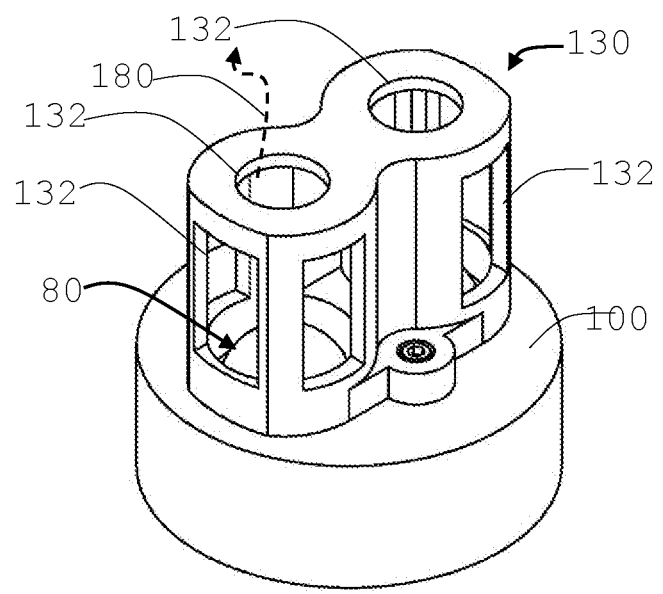
FIG. 13 is a perspective view from the top of one of the embodiment of the cage of the invention that has two rotary valves.
Figure 14:
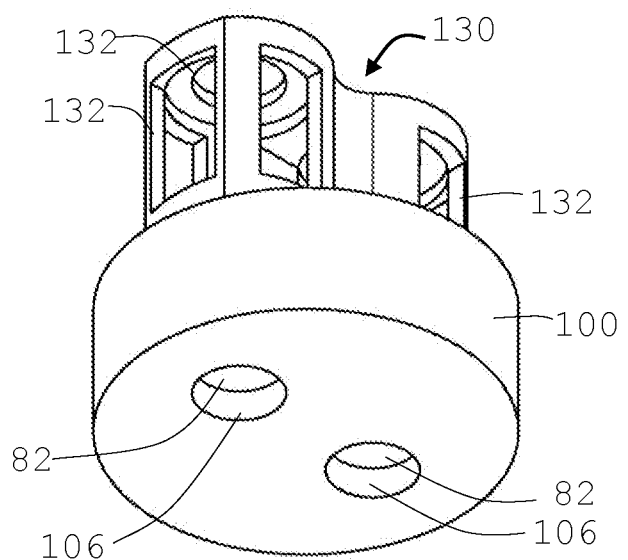
FIG. 14 is a perspective view from the bottom of one of the embodiment of the cage of the invention that has two rotary valves.

Referring to FIG. 13 and FIG. 14, in one embodiment of the apparatus 10, the apparatus 10 further comprises a cage 130. The cage 130 is mounted on the valve seat 100, and a plurality of openings 132 is form on the cage 130 to allow flow 180 to pass. The rotary valve 80 is disposed inside the cage 130 and can move freely inside the cage 130.

What claimed is:

1. An apparatus to allow or stop a flow into a piping system or an enclosed environment, comprising:
    (a) a housing having an upper flow passage and a lower flow passage;
    (b) a valve seat, wherein said valve seat is between said upper flow passage and said lower flow passage, wherein at least one opening is formed on said valve seat, and wherein said at least one opening has an inner diameter;
    (c) at least one rotary valve inside said housing, wherein each of said at least one rotary valve further comprises a main body and two guides mounted to said main body opposite to each other, wherein said at least one rotary valve has a predetermined weight, wherein said main body of said at least one rotary valve is dimensioned to be between said inner diameter of said at least one opening of said valve seat and said inner diameter of said upper flow passage, wherein said rotary valve can rotate axially relative to said guides when said flow from said lower flow passage flows through the housing, and wherein said at least one rotary valve can move inside said upper flow passage and above said valve seat; and
    (d) at least two guide rails inside the upper flow passage for guiding each of said at least one rotary valve between an open position and a closed position, wherein said each of two guides of said at least one rotary valve are disposed in each of said two guide rails, and wherein said two guides move freely up and down in said two guide rails.

2. The apparatus of claim 1, wherein an upper flow passage pressure exists in said upper flow passage, wherein a lower flow passage pressure exists in said lower flow passage, wherein said at least one rotary valve is in said open position when said lower flow passage pressure is greater than said predetermined weight of said at least one rotary valve and said upper flow passage pressure, wherein said main body of said at least one rotary valve is undisposed from said at least one opening formed on said valve seat when said at least one rotary valve is in said open position, wherein said flow can pass through said at least one opening of said valve seat when rotary valve is in said open position, wherein said at least one rotary valve is in said closed position when said lower flow passage pressure is less than or equal to said predetermined weight of said at least one rotary valve and said upper flow passage pressure, wherein said main body of said at least one rotary valve is disposed on said at least one opening formed on said valve seat when said at least one rotary valve is in closed position, and wherein said flow cannot pass through said opening of said valve seat when said at least one rotary valve is in said closed position.

3. The apparatus of claim 1, further comprising at least two turbulators, wherein each of said at least two turbulators comprises a plurality of impellers mounted to said main body of said at least one rotary valve, wherein said plurality of impellers are arranged in a circle around each of said at least two guides, wherein each of said at least two turbulators are opposite to each other, and wherein said at least two turbulators rotate said at least one rotary valve when said flow from said lower flow passage pushes said plurality of impellers.

4. The apparatus of claim 1, further comprising at least two turbulators, wherein each of said at least two turbulators comprises a plurality of impellers radially mounted to each of said guides, and wherein said at least two turbulators rotate said at least one rotary valve when said flow from said lower flow passage pushes said plurality of impellers.

5. The apparatus of claim 1, further comprising an upper flow passage filter located in said upper flow passage and a lower flow passage filter located in said lower flow passage, wherein said upper flow passage filter and said lower flow passage filter have a predetermined sieve sized to prevent a plurality of foreign objects from entering said housing.

6. The apparatus of claim 1, wherein said apparatus is configured to be inside said enclosed environment,
    wherein said enclosed environment has an ambient pressure in said enclosed environment, wherein said enclosed environment further comprises at least one conduit, wherein each said at least one conduit has a first end and a second end, wherein each of said at least one conduit has said first end connected to said lower flow passage of said apparatus and said second end extends out of said enclosed environment, wherein said upper flow passage pressure is adopted to said ambient pressure of said enclosed environment, wherein said at least one rotary valve is in an open position when said lower flow passage pressure is greater than said predetermined weight of said at least one rotary valve and said upper flow passage pressure, and wherein said at least one rotary valve is in a closed position when said lower flow passage pressure is equal to or less than said predetermined weight of said at least one rotary valve and said upper flow passage pressure.

7. The apparatus of claim 1, wherein said apparatus is configured to be outside said enclosed environment, wherein said enclosed environment has an ambient pressure in said enclosed environment, wherein said enclosed environment further comprises at least one conduit, wherein each said at least one conduit has a first end and a second end, wherein each of said at least one conduit has said first end connected to said upper flow passage of said apparatus and said second end connected to and communicated with said enclosed environment, wherein said upper flow passage pressure is adopted to said ambient pressure of said enclosed environment, wherein said at least one rotary valve is in an open position when said lower flow passage pressure is greater than said predetermined weight of said at least one rotary valve and said upper flow passage pressure, and wherein said at least one rotary valve is in a closed position when said lower flow passage pressure is equal to or less than said predetermined weight of said at least one rotary valve and said upper flow passage pressure.

8. The apparatus of claim 1, wherein said apparatus is installed in a piping system, wherein said piping system has a pipe flow which moves between a lower elevation position of said piping system to an upper elevation position of said piping system, wherein said upper flow passage of said apparatus is communicated with said upper elevation position of said piping system, wherein said lower flow passage is communicated with said lower elevation position of said piping system, wherein said at least one rotary valve is in an open position when said pipe flow moves from said lower elevation position of said piping system toward said upper elevation position of said piping system, and wherein said at least one rotary valve is in said closed position when said pipe flow moves from said upper elevation position of said piping system toward said lower elevation of said piping system.

9. The apparatus of claim 1, further comprises at least one cage, wherein a plurality of openings is formed on said cage, wherein said cage is mounted on said valve seat, wherein said at least one rotary valve resides in said cage, and wherein said at least one rotary valve can move inside said cage.

10. An apparatus to allow or stop a flow into a piping system or an enclosed environment, comprising:
(a) a housing having an upper flow passage and a lower flow passage;
(b) a valve seat, wherein said valve seat is between said upper flow passage and said lower flow passage, wherein at least one opening is formed on said valve seat, wherein said at least one opening has an inner diameter;
(c) at least one rotary valve inside said housing, wherein said at least one rotary valve further comprises a main body and two guides mounted to said main body opposite to each other, wherein said rotary valve has at least two turbulators, wherein each of said at least two turbulators comprises a plurality of impellers mounted to said main body of said at least one rotary valve, wherein said at least one rotary valve has a predetermined weight, wherein said main body of said at least one rotary valve is dimensioned to be between said inner diameter of said opening of said valve seat and said inner diameter of said upper flow passage, and wherein said at least one rotary valve can move inside said upper flow passage and said valve seat; and (d) at least two guide rails inside the upper flow passage for guiding each of said at least one rotary valve between an open position and a closed position, wherein said each of two guides of said at least one rotary valve are disposed in each of said two guide rails, wherein said two guides move freely up and down in said two guide rails, wherein an upper flow passage pressure exists in said upper flow passage, wherein a lower flow passage pressure exists in said lower flow passage, wherein said at least one rotary valve is in said open position when said lower flow passage pressure is greater than said predetermined weight of said at least one rotary valve and said upper flow passage pressure, wherein said main body of said at least one rotary valve is undisposed from said at least one opening formed on said valve seat when said at least one rotary valve is in said open position, wherein said flow can pass through said at least one opening of said valve seat when rotary valve is in said open position, wherein said at least one rotary valve is in said closed position when said lower flow passage pressure is less than or equal to said predetermined weight of said at least one rotary valve and said upper flow passage pressure, wherein said main body of said at least one rotary valve is disposed on said at least one opening formed on said valve seat when said at least one rotary valve is in closed position, and wherein said flow cannot pass through said opening of said valve seat when said at least one rotary valve is in said closed position.

11. The apparatus of claim 10, further comprising at least two turbulators, wherein each of said at least two turbulators comprises a plurality of impellers mounted to said main body of said at least one rotary valve, wherein said plurality of impellers are arranged in a circle around each of said at least two guides, wherein each of said two turbulators are opposite to each other, and wherein said at least two turbulators rotate said at least one rotary valve when said flow from said lower flow passage pushes said plurality of impellers.

12. The apparatus of claim 10, further comprising at least two turbulators, wherein each of said at least two turbulators comprises a plurality of impellers radially mounted to each of said guides, and wherein said at least two turbulators rotate said at least one rotary valve when said flow from said lower flow passage pushes said plurality of impellers.

13. The apparatus of claim 10, wherein said apparatus is configured to be inside said enclosed environment, wherein said enclosed environment has an ambient pressure in said enclosed environment, wherein said enclosed environment further comprises at least one conduit, wherein each said at least one conduit has a first end and a second end, wherein each of said at least one conduit has said first end connected to said lower flow passage of said apparatus and said second end extends out of said enclosed environment, wherein said upper flow passage pressure is adopted to said ambient pressure of said enclosed environment, wherein said at least one rotary valve is in an open position when said lower flow passage pressure is greater than said predetermined weight of said at least one rotary valve and said upper flow passage pressure, and wherein said at least one rotary valve is in an closed position when said lower flow passage pressure is equal to or less than said predetermined weight of said at least one rotary valve and said upper flow passage pressure.

14. The apparatus of claim 10, wherein said apparatus is configured to be outside said enclosed environment, wherein said enclosed environment has an ambient pressure in said enclosed environment, wherein said enclosed environment further comprises at least one conduit, wherein each said at least one conduit has a first end and a second end, wherein each of said at least one conduit has said first end connected to said upper flow passage of said apparatus and said second end connected to and communicated with said enclosed environment, wherein said upper flow passage pressure is adopted to said ambient pressure of said enclosed environment, wherein said at least one rotary valve is in an open position when said lower flow passage pressure is greater than said predetermined weight of said at least one rotary valve and said upper flow passage pressure, and wherein said at least one rotary valve is in a closed position when said lower flow passage pressure is equal to or less than said predetermined weight of said at least one rotary valve and said upper flow passage pressure.

15. The apparatus of claim 10, wherein said apparatus is installed in a piping system, wherein said piping system has a pipe flow moves between a lower elevation position of said piping system to a upper elevation position of said piping system, wherein said upper flow passage of said apparatus is communicated with said upper elevation position of said piping system, wherein said lower flow passage is communicated with said lower elevation position of said piping system, wherein said at least one rotary valve is in an open position when said pipe flow moves from said lower elevation position of said piping system toward said upper elevation position of said piping system, and wherein said at least one rotary valve is in said closed position when said pipe flow moves from said upper elevation position of said piping system toward said lower elevation of said piping system.

16. An apparatus to allow or stop a flow into a piping system or an enclosed environment, comprising:
   (a) a housing having an upper flow passage and a lower flow passage;
   (b) a valve seat, wherein said valve seat is between said upper flow passage and said lower flow passage, wherein at least one opening is formed on said valve seat, wherein said at least one opening has an inner diameter;
   (c) at least one rotary valve inside said housing, wherein each of said at least one rotary valve further comprises a main body and two guides mounted to said main body opposite to each other, wherein said at least one rotary valve has a predetermined weight, wherein said main body of said at least one rotary valve is dimensioned to be between said inner diameter of said opening of said valve seat and said inner diameter of said upper flow passage, and wherein said at least one rotary valve can move inside said upper flow passage and above said valve seat;
   (d) at least two guide rails inside the upper flow passage for guiding each of said at least one rotary valve between an open position and a closed position, wherein said each of two guides of said at least one rotary valve are disposed in each of said two guide rails, and wherein said two guides move freely up and down in said two guide rails;
   (e) an upper flow passage filter;
   (f) a lower flow passage filter, wherein said upper flow passage filter and said lower flow passage filter have a predetermined sieve sized to prevent a plurality, of foreign objects from entering said housing;
   (g) at least two turbulators, wherein each of said at least two turbulators comprises a plurality of impellers radially mounted to each of said guides, and wherein said at least two turbulators rotate said at least one rotary valve when said flow from said lower flow passage pushes said plurality of impellers, wherein an upper flow passage pressure exists in said upper flow passage, wherein a lower flow passage pressure exists in said lower flow passage, wherein said at least one rotary valve is in a closed position when said at least one rotary valve rests on said valve seat to seal said at least one opening of said valve seat, wherein said at least one rotary valve is in said open position when said at least one rotary valve moves away from said valve seat to unseal said at least one opening of said valve seat, wherein said at least one rotary valve is in said open position when said lower flow passage pressure is greater than said predetermined weight of said at least one rotary valve and said upper flow passage pressure, wherein said at least one rotary valve is in said closed position when said lower flow passage pressure is less than or equal to said predetermined weight of said at least one rotary valve and said upper flow passage pressure, wherein said flow cannot pass through said at least one opening of said valve seat when said at least one rotary valve is in said closed position, and wherein said flow can pass through said at least one opening of said valve seat when rotary valve is in said open position.

17. The apparatus of claim 16, wherein said apparatus is configured to be inside said enclosed environment,
   wherein said enclosed environment has an ambient pressure in said enclosed environment, wherein said enclosed environment further comprises at least one conduit, wherein each said at least one conduit has a first end and a second end, wherein each of said at least one conduit has said first end connected to said lower flow passage of said apparatus and said second end extends out of said enclosed environment, wherein said upper flow passage pressure is adopted to said ambient pressure of said enclosed environment, wherein said at least one rotary valve is in an open position when said lower flow passage pressure is greater than said predetermined weight of said at least one rotary valve and said upper flow passage pressure, and wherein said at least one rotary valve is in a closed position when said lower flow passage pressure is equal to or less than said predetermined weight of said at least one rotary valve and said upper flow passage pressure.

18. The apparatus of claim 16, wherein said apparatus is configured to be outside said enclosed environment,
   wherein said enclosed environment has an ambient pressure in said enclosed environment, wherein said enclosed environment further comprises at least one conduit,
   wherein each said at least one conduit has a first end and a second end, wherein each of said at least one conduit has said first end connected to said upper flow passage of said apparatus and said second end connected to and communicated with said enclosed environment, wherein said upper flow passage pressure is adopted to said ambient pressure of said enclosed environment, wherein said at least one rotary valve is in an open position when said lower flow passage pressure is greater than said predetermined weight of said at least one rotary valve and said upper flow passage pressure, and wherein said at least one rotary valve is in a closed position when said lower flow passage pressure is equal to or less than said predetermined weight of said at least one rotary valve and said upper flow passage pressure.

19. The apparatus of claim 16, wherein said apparatus is installed in a piping system, wherein said piping system has a pipe flow and moves between a lower elevation position of said piping system to an upper elevation position of said piping system, wherein said upper flow passage of said apparatus is communicated with said upper elevation position of said piping system, wherein said lower flow passage is communicated with said lower elevation position of said piping system, wherein said at least one rotary valve is in an open position when said pipe flow moves from said lower elevation position of said piping system toward said upper elevation position of said piping system, and wherein said at least one rotary valve is in said closed position when said pipe flow moves from said upper elevation position of said piping system toward said lower elevation of said piping system.

20. An apparatus to allow or stop a flow into a piping system or an enclosed environment, comprising:
(a) a housing having an upper flow passage and a lower flow passage;
(b) a valve seat, wherein said valve seat is between said upper flow passage and said lower flow passage, wherein at least one opening is formed on said valve seat, wherein said at least one opening has an inner diameter;
(c) at least one rotary valve inside said housing, wherein each of said at least one rotary valve further comprises a main body and two guides mounted to said main body opposite to each other, wherein said at least one rotary valve has a predetermined weight, wherein said main body of said at least one rotary valve is dimensioned to be between said inner diameter of said opening of said valve seat and said inner diameter of said upper flow passage, and wherein said at least one rotary valve can move inside said upper flow passage and above said valve seat;
(d) at least two guide rails inside the upper flow passage for guiding each of said at least one rotary valve between an open position and a closed position, wherein said each of two guides of said at least one rotary valve are disposed in each of said two guide rails, and wherein said two guides move freely up and down in said two guide rails;
(e) an upper flow passage filter;
(f) a lower flow passage filter, wherein said upper flow passage filter and said lower flow passage filter have a predetermined sieve sized to prevent a plurality of foreign objects from entering said housing;
(g) at least two turbulators, wherein each of said at least two turbulators comprises a plurality of impellers mounted to said main body of said at least one rotary valve, wherein said plurality of impellers are arranged in a circle around each of said at least two guides, wherein each of said at least two turbulators are opposite to each other, wherein said at least two turbulators rotate said at least one rotary valve when said flow from said lower flow passage pushes said plurality of impellers, wherein an upper flow passage pressure exists in said upper flow passage, wherein a lower flow passage pressure exists in said lower flow passage, wherein said at least one rotary valve is in a closed position when said at least one rotary valve rests on said valve seat to seal said at least one opening of said valve seat, wherein said at least one rotary valve is in said open position when said at least one rotary valve moves away from said valve seat to unseal said at least one opening of said valve seat, wherein said at least one rotary valve is in said open position when said lower flow passage pressure is greater than said predetermined weight of said at least one rotary valve and said upper flow passage pressure, wherein said at least one rotary valve is in said closed position when said lower flow passage pressure is less than or equal to said predetermined weight of said at least one rotary valve and said upper flow passage pressure, wherein said flow cannot pass through said at least one opening of said valve seat when said at least one rotary valve is in said closed position, and wherein said flow can pass through said at least one opening of said valve seat when rotary valve is in said open position.

21. The apparatus of claim 20, wherein said apparatus is configured to be inside said enclosed environment,
wherein said enclosed environment has an ambient pressure in said enclosed environment, wherein said enclosed environment further comprises at least one conduit, wherein each said at least one conduit has a first end and a second end, wherein each of said at least one conduit has said first end connected to said lower flow passage of said apparatus and said second end extends out of said enclosed environment, wherein said upper flow passage pressure is adopted to said ambient pressure of said enclosed environment, wherein said at least one rotary valve is in an open position when said lower flow passage pressure is greater than said predetermined weight of said at least one rotary valve and said upper flow passage pressure, and wherein said at least one rotary valve is in a closed position when said lower flow passage pressure is equal to or less than said predetermined weight of said at least one rotary valve and said upper flow passage pressure.

22. The apparatus of claim 20, wherein said apparatus is configured to be outside said enclosed environment,
wherein said enclosed environment has an ambient pressure in said enclosed environment, wherein said enclosed environment further comprises at least one conduit, wherein each said at least one conduit has a first end and a second end, wherein each of said at least one conduit has said first end connected to said upper flow passage of said apparatus and said second end connected to and communicated with said enclosed environment, wherein said upper flow passage pressure is adopted to said ambient pressure of said enclosed environment, wherein said at least one rotary valve is in an open position when said lower flow passage pressure is greater than said predetermined weight of said at least one rotary valve and said upper flow passage pressure, and wherein said at least one rotary valve is in a closed position when said lower flow passage pressure is equal to or less than said predetermined weight of said at least one rotary valve and said upper flow passage pressure.

23. The apparatus of claim 20, wherein said apparatus is installed in a piping system, wherein said piping system has a pipe flow moves between a lower elevation position of said piping system to a upper elevation position of said piping system, wherein said upper flow passage of said apparatus is communicated with said upper elevation position of said piping system, wherein said lower flow passage is communicated with said lower elevation position of said piping system, wherein said at least one rotary valve is in an open position when said pipe flow moves from said lower elevation position of said piping system toward said upper elevation position of said piping system, and wherein said at least one rotary valve is in said closed position when said pipe flow moves from said upper elevation position of said piping system toward said lower elevation of said piping system.

* * * * *